United States Patent [19]

Bruyére

[11] Patent Number: 5,080,544
[45] Date of Patent: Jan. 14, 1992

[54] ADJUSTABLE LOCKNUT ASSEMBLY

[75] Inventor: René M. Bruyére, Housse, Belgium

[73] Assignee: Shur-Lok Insternational, S.A., Petit-Rechain, Belgium

[21] Appl. No.: 533,676

[22] Filed: Jun. 5, 1990

[30] Foreign Application Priority Data

Jun. 6, 1989 [FR] France ................ 89 07459

[51] Int. Cl.$^5$ ............................................. F16B 39/10
[52] U.S. Cl. .................... 411/120; 411/200; 411/431
[58] Field of Search ............ 411/120, 121, 198–201, 411/213, 431, 429, 432

[56] References Cited

U.S. PATENT DOCUMENTS

| 470,677 | 3/1892 | Jaynes et al. .................. 411/200 |
| 1,245,966 | 11/1917 | Purcell ....................... 411/200 |
| 1,451,476 | 4/1923 | Schieber ...................... 411/431 |
| 3,844,323 | 10/1974 | Anderson, Jr. . |

FOREIGN PATENT DOCUMENTS

| 825722 | 3/1938 | France ........................ 411/200 |
| 352582 | 5/1945 | France ........................ 411/200 |
| A067772 | 3/1958 | France ........................ 411/200 |
| 496832 | 12/1938 | United Kingdom ................ 411/200 |

OTHER PUBLICATIONS

Catalog, "Bearing Locknuts", (Shur-Lok Corporation) 1974.

Primary Examiner—Neill R. Wilson
Attorney, Agent, or Firm—Price, Gess & Ubell

[57] ABSTRACT

An improved locknut assembly for mounting on a shaft includes a first member for engagement with the shaft to provide a predetermined torque force. A second member extends over both the shaft and the first member and can be removably mounted on the first member for fixing it to the shaft. The first and second members are complementarily configured to permit relative adjustment to accommodate the desired predetermined torque force and to accommodate a member for securing the first and second members together in a fixed position.

9 Claims, 2 Drawing Sheets

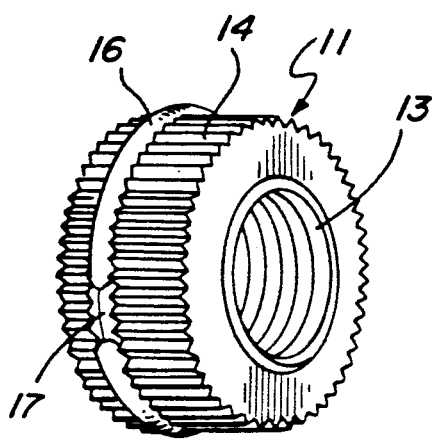
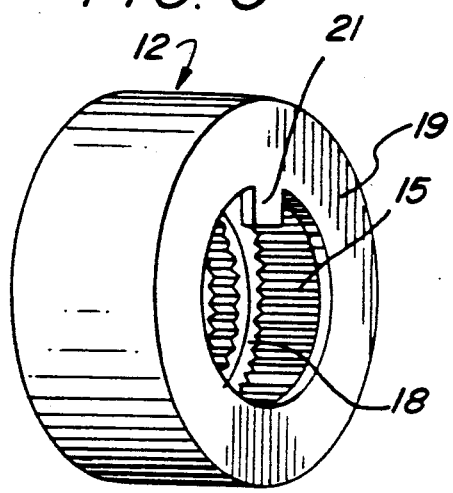
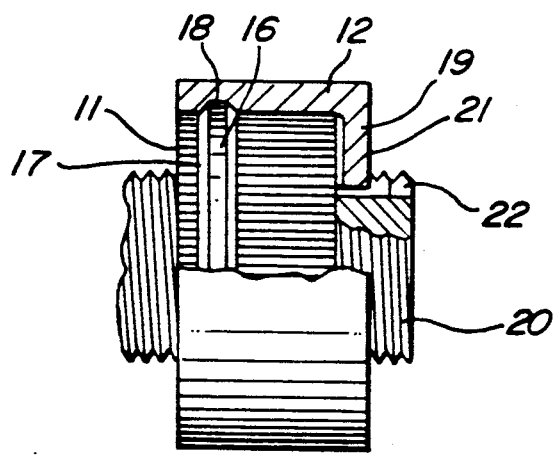

ADJUSTABLE LOCKNUT ASSEMBLY

BACKGROUND OF THE INVENTION

1. Field of the Invention

The present invention relates to locknut assemblies designed to be locked into a certain position after being screwed onto a threaded member and, more particularly, to locknut assemblies that can be adjusted while maintaining a predetermined torque.

2. Description of Related Art

It is well known that locknuts are capable of preventing the antirotation of bolts. In a typical conventional construction, the bolt or shaft can be provided with an axial groove or keyway, while the locknut will be equipped with an annular locking member having an inwardly-extending key. The locking member is adapted to extend over the shaft with the key extending into the bolt keyway. The locking member is also frequently provided with the ability to lock the nut into position to prevent the locknut from turning on the shaft. A widely-used locknut assembly includes a locknut which has provided, on one of its end faces, diametrical notches that can be used to lock the nut onto a shaft. The locknut can be screwed onto a threaded rod or shaft that is provided with a radial through hole. The diametrical notches in the locknut must be positioned opposite the through hole in the shaft, and a pin, such as a Carter pin, can be inserted into the nut so that it seats within the two notches in order to lock the nut onto the shaft. A constant problem that exists in this field lies in the fact that the proper tightening of a locknut depends on specific diametrical notches of the locknut being brought into a complementary position relative to the through hole in the threaded rod or shaft. Thus, if the two notches in the locknut are not properly aligned with the through hole in the threaded shaft, when the locknut has been tightened to a predetermined design torque, it then becomes impossible to securely place the Carter pin into position. Accordingly, the locknut then must be rotated to either loosen the torque or increase the torque beyond the desired level to permit the complementary insertion of the Carter pin.

Numerous attempts have been made in the prior art to resolve this continuing problem in an economical manner. For example, U.S. Pat. No. 3,844,323 discloses a lock assembly wherein a lock ring is mounted within an undercut annular recess of the locknut to accommodate adjustments in locking the nut assembly within a desired torque range. As can be readily appreciated, numerous attempts have been made to resolve this problem in an economical manner that is complementary with the specific application of the locknut assembly in its intended point of use. Thus, the prior art is still seeking to provide the optimum solution for specific applications of maintaining a predetermined torque or rotational position between a shaft member and a locknut.

SUMMARY OF THE INVENTION

The present invention provides an improved locknut assembly for mounting on a shaft that is preferably threaded. A first member is capable of engagement with the shaft to exert a predetermined torque force. The first member can have a cylindrical configuration with an internal aperture appropriately threaded for mounting on the shaft. The exterior surface of the first member can be grooved along the longitudinal direction. A second member is designed to extend over both the shaft and the first member, and can have an internal hollow cylindrical configuration to substantially encapsulate and interface with the outer surface of the first member. Complementary grooves or flutes can be provided to ensure a fixed, although adjustable, interface between the first member and the second member. The second member can also be configured to accommodate an application of the desired predetermined torque force, for example, by having planar facets to form a hexagonal nut configuration on its outer surface. The second member can be connected directly to the shaft, for example, in the conventional tongue and groove configuration, or through the use of a Carter pin extending through notches on the exterior end face of the second member and through a bore or aperture drilled through the shaft member.

As an alternative feature, a split lock ring can be utilized for fastening the respective first and second members together.

As can be readily determined, an object of the present invention is to provide a locknut assembly that can constitute first locking means designed to be disposed opposite second locking means that are provided on the threaded rod or shaft onto which the locknut assembly is designed to be screwed to provide a predetermined torque force. The locknut assembly includes a first part which can constitute a nut configuration per se, and a second part carrying the first locking means and further possessing a fine pitch internal ribbing or groove configuration designed to mate with complementary external ribbing or grooves provided on the peripheral surfaces of the nut.

The first locking means can comprise two diametrical notches provided on one of the end faces of the second part, with the notches being designed to accommodate a locking mechanism, for example, in the form of a Carter pin designed to pass through a radial hole provided in the threaded shaft in order to lock the nut assembly with the respective shaft. The second part member can have a hexagonal peripheral surface enabling it to be rotated by means of a conventional tool in order to screw the locknut assembly onto the threaded rod. The first locking means can consist of a catch or tongue so disposed on one of the end faces of the second part as to extend radially inward into a longitudinal slot provided in the threaded shaft, in order to lock the nut assembly with respect to the rod. As can be readily appreciated, the respective parts to the locking assembly can be adjusted by removing and accommodating the exterior part member constituting a hexagonal peripheral surface to accommodate the specific locking mechanism for maintaining the predetermined torque force.

In another embodiment of the present invention, the locknut assembly can further include retaining means for engaging the first and second parts that can comprise an annular split spring seated in a groove provided on the peripheral surface of the first part, with the annular spring being designed to snap into a second groove provided on the inner wall of the second part.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings.

BRIEF DESCRIPTION OF THE DRAWINGS

FIG. 5 is a perspective view of a first part of the locknut assembly according to a second embodiment of the present invention;

FIG. 6 is a perspective view of a second part of the locknut assembly according to a second embodiment of the present invention; and FIG. 7 is a longitudinal partial cutaway view of a locknut assembly according to a second embodiment of the present invention.

DESCRIPTION OF THE PREFERRED EMBODIMENTS

The following description is provided to enable and person skilled in the field of locknut assemblies to make and use the invention and sets forth the best modes contemplated by the inventor of carrying out his invention. Various modifications, however, will remain readily apparent to those skilled in the art, since the generic principles of the present invention have been defined herein specifically to provide an improved adjustable locknut assembly.

Figure 1:
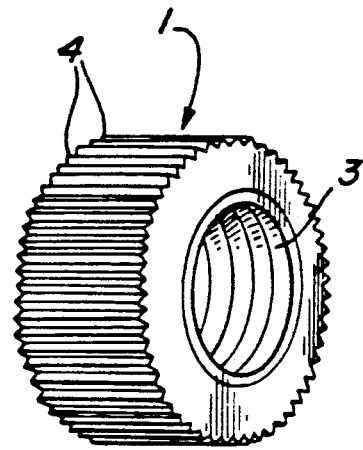
FIG. 1 is a perspective view of a first part of the locknut assembly according to a first embodiment of the present invention.

FIGS. 1 through 4 illustrate a first embodiment of the locknut assembly. FIG. 1 discloses a perspective view of a first member 1 that is designed to be complementarily assembled with a second member 2 illustrated in FIG. 2. The first member 1 comprises a nut per se having a longitudinal aperture with an internal threaded surface 3. The first member 1 has a cylindrical outer configuration with a series of longitudinal grooves, for example, of a triangular fluted configuration extending about the entire side cylindrical surface. Preferably, these grooves are external ribbings 4 of a relatively fine pitch across the entire peripheral surface, and permit a rotatable adjustment of the first member 1 within the range of acceptable torque forces that are to be applied by the nut in combination with the shaft (not shown).

Figure 2:
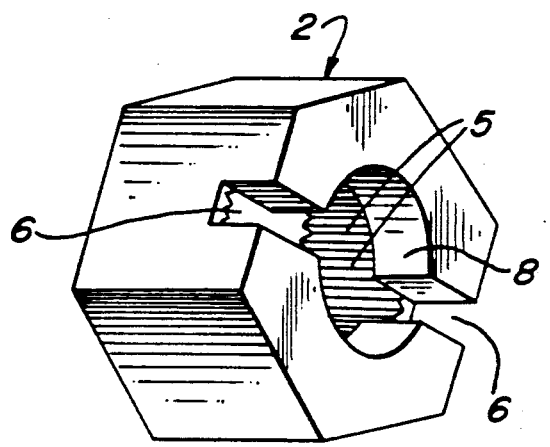
FIG. 2 is a perspective view of a second part of the locknut assembly according to the first embodiment.
Figure 3:
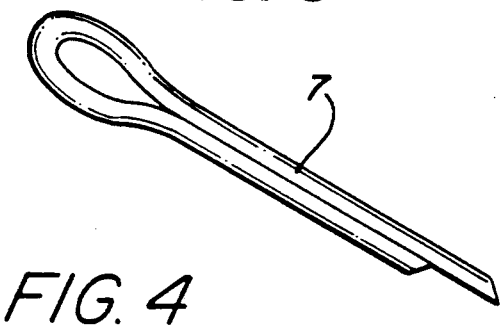
FIG. 3 is a plan view of the conventional locking mechanism.
Figure 4:
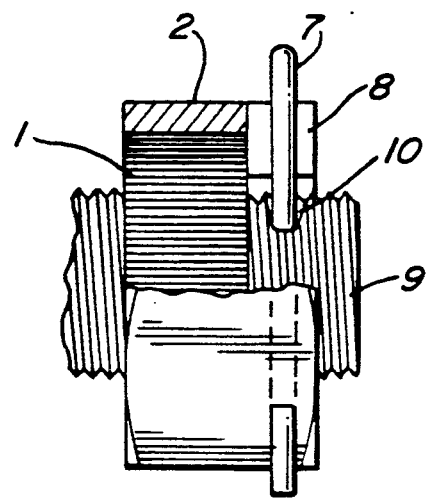
FIG. 4 is a longitudinal partial cutaway view of a locknut assembly according to a first embodiment of the present invention.

The second member 2 has a hollow internal cylindrical configuration and is of a dimension to substantially encapsulate the outer cylindrical side surface of the first part member 1. The second member 2 also has an aperture at one end designed to accommodate the passage of the threaded shaft or rod 9, as seen in FIG. 3. The second member 2 will also have a series of longitudinal extending ribs or grooves 5 along its internal peripheral surface of a complementary configuration to that of the external ribs 4 on the first member 1. These respective ribs can constitute a positive locking action between the respective parts. The exterior surface of the second member 2 preferably has a hexagonal peripheral configuration formed of a series of planar facets, as shown in FIGS. 2 and 4. This hexagonal configuration can enable it to be rotated by means of a conventional tool to exert the torquing force on the first member 1. However, as can be seen from the second embodiment, to be discussed subsequently, other exterior peripheral surfaces can be used, such as a smooth cylindrical peripheral configuration.

At one end face of the second member 2, a flat surface can have recessed diametrically opposite notches 6 that are specifically designed to accommodate a locking mechanism such as shown in FIG. 3 in the form of a Carter pin 7. The same end face of the second member 2 has a flange 8 that surrounds the notches 6. This flange 8 defines a circular opening of a diameter to permit the passage of the threaded rod or shaft 9, as seen in FIG. 4. The locking pin 7 can extend through a radial aperture or bore 10 that extends through the shaft 9.

The locknut assembly according to this first embodiment can be assembled as follows. The second member 2 can be inserted onto the first member 1 after the first member 1 has been rotated onto the shaft for a loose fit or can be preassembled together with the first member 1 and then rotated onto the shaft. As can be appreciated, when the second member 2 is mounted to encompass the first member 1, the ribbing 5 of the second member 2 engages with the ribbing 4 on the first member 1. The combined locknut assembly can be screwed onto the threaded shaft 9, for example, by means of a wrench that will mate with at least two opposite planar facets of the hexagonal surface of the second member 2. The first member 1, which constitutes the nut for engagement with the threaded shaft, is rotated along with the second member 2 due to the fact that the internal ribbing 5 of the latter is engaged with the external ribbing 4 of the first member 1.

As can be appreciated, the first member 1 could also be alternatively screwed onto the threaded rod 9 separately with a special wrench configuration having a shape complementary to that of the rib surface of the nut.

In either event, the first member 1 is tightened to a desired torque force on the threaded shaft 9. In the case where the first member 1 has been screwed on by means of the second member 2, and the notches 6 on the second member 2 are not located opposite the radial hole or bore 10 in the threaded rod 9, the second member 2 need only be withdrawn, rotated by the necessary angle so that the notches 6 are aligned with the hole 10, and again reinserted over the first member 1 so that it engages.

In the case where the first member 1 is screwed onto the threaded rod directly by means of a special wrench, the notches 6 in the second member 2 can be appropriately aligned with the hole 10 in the threaded shaft so that the second member 2 is then inserted so that it engages with the nut at the appropriate position for receiving the locking pin 7. As can be readily appreciated, the insertion of the locking pin 7 through the notches 6 on the second member 2 and the aperture 10 in the shaft is of a conventional configuration. The ends of the locking pin 7 can then be separated or deformed, if necessary, to provide a further locking in place.

A second embodiment of the present invention is disclosed in FIGS. 5 through 7.

FIG. 5 discloses a first part member 11 that is designed to be assembled with a second part member 12, as illustrated in FIG. 6. The first part member 11 constitutes a nut per se provided with an internal thread 13. The first part member 11 has a cylindrical shape and can also include means, in the form of longitudinal extending ribbing or fluting 14, across its entire peripheral surface. This ribbing can also have a fine pitch as previously described with the first embodiment. A cylindrical second member 2 has an internal cylindrical configuration with its inner wall provided with internal ribbing 15 complementary to the external ribbing 14 of the first part member 11. This permits the assembly of the two parts as illustrated in FIG. 7. As can be readily appreciated, the internal ribbing 15 on the second part member 12 can constitute a positive lock when interfaced with the external ribbing 14 on the first part member 11.

The respective locknut members 11 and 12 can be provided with retaining means for securing them together. This retaining means can include an annular split spring 16 that can be seated within a groove 17 extending annularly about the peripheral surface of the first part member 11. The annular spring 16 is of such a configuration that it can be designed to snap into a groove 18 provided annularly about the inner wall of the second part member 12 when they are assembled together. As can be appreciated, the split spring 16 can constitute a locking mechanism for holding the respective alignment of the first and second locknut parts.

Referring to FIGS. 6 and 7, the second part member 12 can be provided on one of its end surfaces with an inwardly-directed flange 19. The flange 19 surrounds a circular opening or aperture of a diameter to permit the passage of a threaded rod or shaft 20 that is to be engaged with the locknut assembly. The interface of the flange 19 is designed to come into abutment with one of the end faces of the first part member 11 when the parts are assembled. A catch or key member 21 can project radially inward from the flange 19 to mate with a longitudinal slot 22 provided on the threaded shaft 20 in order to lock the second part member 12 annularly in relationship to the threaded rod 20, thus locking the first part member 11 onto the shaft 20. This can be seen in FIG. 7.

The second nut assembly of the present invention can be assembled as follows. The first part member 11 constitutes the nut to be screwed onto the threaded rod 20 by means of a polygonal wrench whose shape is complementary to that of the rib surface of the first part member 11. The first part member 11 can then be tightened to a desired torque prior to the second part member 12 being mounted to encapsulate the first part member 11. In order to mount the second part member 12 on the first part member 11, it is necessary to align the catch 21 on the second part member 12 with the slot 22 in the threaded rod or shaft 20, and to simultaneously insert the internal ribbing 15 on the second part member 12 so that it engages with the external ribbing 14 on the first part member 11. The second part member 12 is then moved axially over the first part member 11 until the annular spring 16 snaps into the respective groove 18 in the second part member 12. The second part member 12 is thus held in place by the annular spring 18 and locked annularly by the catch 21 that penetrates into the slot 22 on the threaded rod 20. The first part member 11 is thereby engaged with the second part member 12, while maintaining the precise torque force required. The second part member 12 not only assists in locking the nut member in place, but also forms a cover to protect the lock member and to prevent damage to the external ribs 14.

The present invention has been described in its preferred embodiments, but a person of ordinary skill in this field, recognizing the spirit and scope of the present invention, can make various modifications. Thus the invention should be defined only from the following claims.

What is claimed is:

1. An improved locknut assembly for mounting on a shaft, comprising:

a first member for engagement with the shaft to provide a predetermined torque force having an internal aperture extending longitudinally through it of a size to accommodate the shaft and a series of longitudinal external grooves on its periphery, of a fine pitch, the first member has a cylindrical configuration with the series of grooves being adjacent to each other and extending about the entire outer surface;

a second member extending over both the shaft and the first member to cover the cylindrical exterior surface of the first member, the second member has an internal hollow cylindrical configuration, the second member is removable from the first member and capable of being fixedly connected to the first member at numerous positions about the first member to accommodate the desired predetermined torque force, the second member having an internal aperture extending longitudinally through the second member to accommodate the shaft and a series of longitudinal internal grooves on the internal cylindrical peripheral surface substantially complementary to the first member's external grooves to permit an adjustable fixing of the first and second members; and means for securing the first member and second member together in a fixed position relative to the shaft.

2. The locknut assembly of claim 1 wherein the second member has an internal hollow configuration of a size to substantially extend over a side outer surface of the first member.

3. The locknut assembly of claim 2 wherein the second member has an external surface of a series of planar facets.

4. The locknut assembly of claim 2 wherein the second member includes a locking portion for engagement with the shaft.

5. The locknut assembly of claim 2 wherein the second member has an internal triangular fluted configuration extending along a longitudinal axis and the first member has on its side outer surface a complementary triangular fluted configuration to permit an adjustable fixing of the first and second members.

6. The locknut assembly of claim 2 wherein the second member has a peripheral internal groove and the first member has a peripheral external groove, the assembly further including a split lock ring for mounting in the respective grooves to fasten the first and second members together.

7. The locknut assembly of claim 2 wherein the second member has a pair of notches and the shaft has an aperture, the assembly further including a member extending through the shaft aperture and the respective notches to secure the second member to the shaft.

8. The locknut assembly of claim 7 wherein the first member has an internal aperture that is threaded.

9. The locknut assembly of claim 8 wherein the second member has a plurality of facets on its outer surface to permit an application of torque.

* * * * *